Patented Feb. 26, 1946

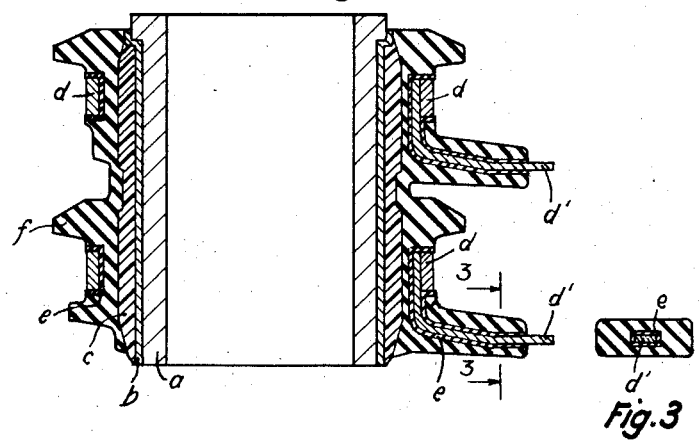
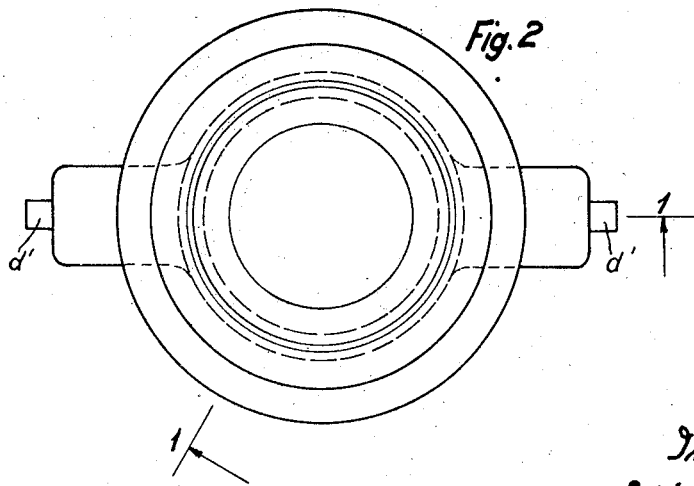

2,395,785

UNITED STATES PATENT OFFICE 2,395,785

RUBBER INSULATION FOR METALLIC CONDUCTORS

Emil Klingler, Korntal, Otto Knapp, Flacht, Kreis Leonberg, and Moritz Lutz, Stuttgart-Weilimdorf, Germany; vested in the Alien Property Custodian Application March 6, 1939, Serial No. 260,172
In Germany March 11, 1938

2 Claims. (Cl. 154—2.6)

It is known to make insulations of hard rubber (vulcanite) for metallic parts which are built into apparatus of various kinds. These vulcanite mixtures made from natural raw rubber have a heat-stability of about 90–110° C. (according to Martens) and a medium elasticity that suffices to prevent strains and cracks at the vulcanized-in metal insertions. If, however, it is attempted to increase the heat-stability of such insulations, as is in itself urgently necessary, for instance by the addition of suitable filling materials, they become extremely brittle as the specific gravity rises, and mechanically of inferior value and thus useless.

The Martens test is a known method of ascertaining the heat-stability of a test piece of rubber and gives an indication of the temperature at which the rubber breaks down and commences to flow under a predetermined load applied as a compression stress to a rubber test piece of predetermined dimensions.

It is further known while using artificial rubber, of the Buna type, for example, to make vulcanite insulations which, with a heat-stability of 150° C. (according to Martens) and upwards, and at the same time of low specific weight, are still sufficiently firm or solid. Such vulcanite mixtures remain stable and firm even at high working temperatures and do not suffer in their moulding quality by softening or shrinkage. They have, however, the drawback of being almost inelastic, and therefore the vulcanizing-in of metal parts, especially parts of difficult shape, which are generally anchored on all sides, is not advisable in such vulcanite compositions, owing to the risk of cracking associated therewith.

The present invention removes these defects by a finished vulcanized intermediate layer being interposed between the metal parts and the highly heat-stable vulcanite or hard rubber insulation.

This intermediate layer, on the one hand, absorbs for the most part the shrinkage stresses resulting during the succeeding vulcanization or when in use, and thus prevents the formation of cracks, and, on the other hand, forestalls a part of the general shrinkage. This intermediate layer must be more elastic than the highly heat-stable vulcanite outer layer. As a rule, it will be of high or the highest elasticity so that great strains which would cause cracks can be elastically absorbed. Where the insulation is of relatively large dimensions, normal heat-stable material even of medium elasticity will be advantageously used for the purpose, in order to absorb elastically as far as possible the shrinkages occurring during vulcanization owing to the large dimensions of the insulations, which also necessitate comparatively thick walls for the highly heat-stable vulcanite. Such an intermediate layer of high or maximum or medium elasticity has in its turn already undergone a shrinkage in the vulcanizing-on process and therefore the general shrinkage of the insulation is considerably reduced. The thickness of the walls of the elastic vulcanite layer will thus be made as great as possible. An intermediate layer of medium elasticity has, furthermore, also the advantage that when the highly heat-stable vulcanite or hard rubber is moulded under pressure round it or wrapped round it, it remains sufficiently firm without softening and without being pressed out of place by the metallic part.

In the elastic vulcanite or hard rubber mixture for the intermediate layer, consisting of raw rubber, sulphur, and suitable additional fillers, the sulphur content should preferably be below 32% of the raw rubber content so that the vulcanite may not be brittle. For the same reason, the total additional fillers suitable for the purpose do not amount to more than 5% of the raw rubber content.

The accompanying drawing illustrates the invention in one example of construction. In the drawing:

Figure 1 is a section through the hub of a distributor of a twin-magneto.

Figure 2 is a corresponding plan view.

Figure 3 is a section of the ignition member on the line A—A of Figure 1.

The distributor hub shown in Figure 1 consists in known manner of an aluminium tube $a$, which is preferably provided with a coating or covering of soft iron $b$, for example, by the Schoop metal-spraying process. This coating or covering of soft iron is necessary in this example, because the vulcanized-on intermediate vulcanite or elastic hard rubber layer $c$ of high mechanical strength having a normal heat-stability of 90–110° C. does not firmly adhere directly to the aluminium surface, while it adheres firmly to the iron. This is perhaps to be ascribed to the greater adhesiveness of the intermediate layer of a sulphide probably occurring on the surface of the metallic iron, which may arise by the action of the sulphur contained in the vulcanized elastic vulcanite on the iron. The elastic layer also adheres better to copper, for example, than aluminium, and therefore, instead of iron, other coating metal, such as copper, can be used. It is particularly advantageous to apply this intermediate layer of iron by spraying, although other metallizing processes, e. g. thermal vaporizing, electrolytic metal coatings and so forth, or oxidized metals, for instance anodized aluminium, may also be employed for the purpose.

The spraying gives a more or less uneven surface on the coating metal to which the elastic layer $c$ adheres particularly well. In some cases, the vulcanite layer is turned after the vulcanization. The current-conducting slip-rings $d$, which are electrically connected to the distributor electrodes $d'$, are coated or covered in accordance with the invention, and corresponding to the circumstances of the case on all sides or not on all sides, with a highly elastic rubber layer $e$ which sometimes itself may consist of several layers of different elasticity, and the thickness of which layer may amount, for example, to 3 mm. Instead of the highly elastic intermediate layer, one of a normal heat-stable material of medium elasticity may also be employed in some cases within the scope of the invention. The sleeve covered or coated with the vulcanite layer of high mechanical strength is then assembled with the prepared metal part in a suitable mould, and a highly heat-stable vulcanite or hard rubber layer $f$ which is built up of artificial rubber, moulded round them under pressure. This heat-stable vulcanite layer may be formed of artificial hard rubber, of the Buna type, for example, or natural hard rubber with suitable filling material. Finally, the finishing vulcanizing is done.

The multi-layer insulation according to the invention is not limited only to current-carrying parts, but may also be employed in other cases, for example, as a heat insulation.

We declare that what we claim is:

1. A distributor hub, comprising an aluminium core, an iron coating on said core, an intermediate layer of hard rubber of high elasticity and an outer covering of highly heat-stable relatively inelastic vulcanite.

2. A hard-rubber-insulated metal part comprising an aluminium core, an iron coating on said core, an intermediate layer of hard rubber of high elasticity on said iron coating and an outer covering of vulcanized relatively inelastic hard rubber on said intermediate layer.

EMIL KLINGLER.
OTTO KNAPP.
MORITZ LUTZ.